No. 751,251. PATENTED FEB. 2, 1904.
J. C. & G. E. BOLLINGER.
KNIFE.
APPLICATION FILED JULY 11, 1903.
NO MODEL.
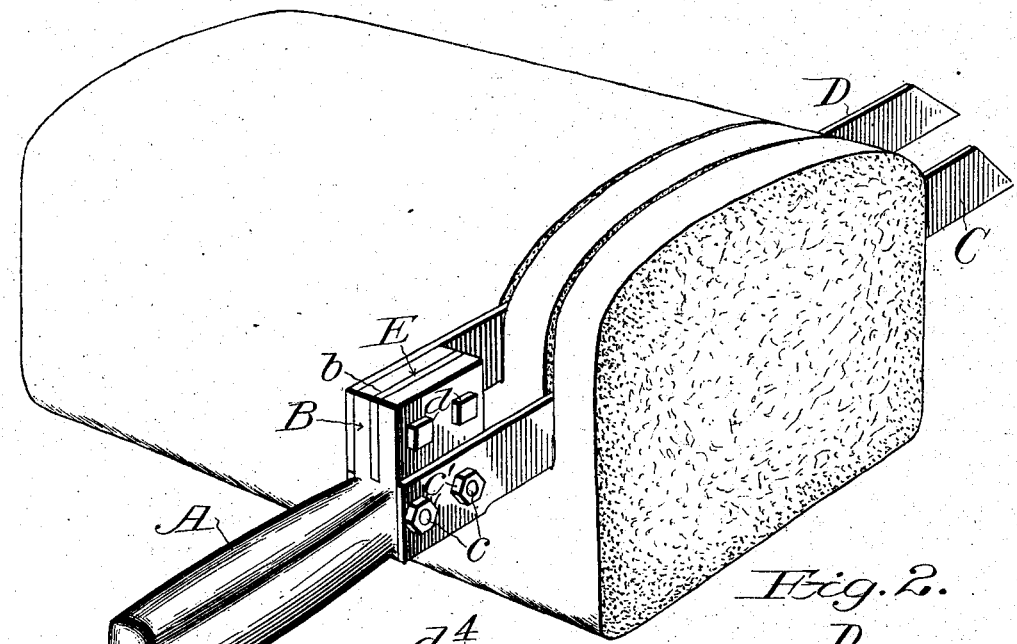
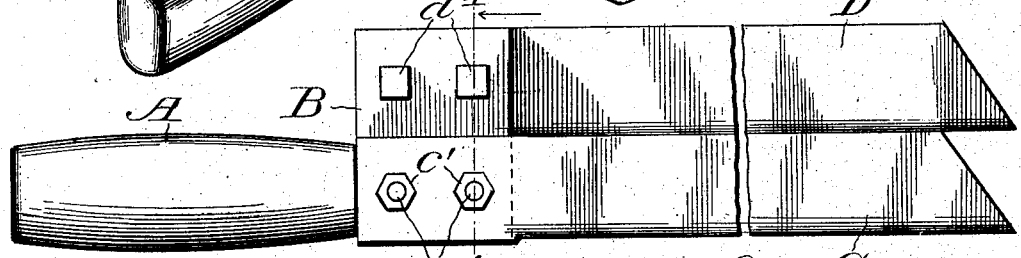
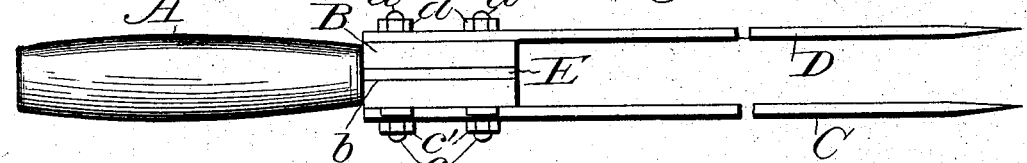
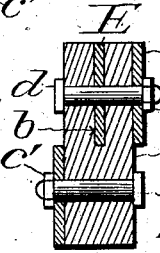
WITNESSES:
C. H. Walker
James R. Mansfield
INVENTORS.
John C. Bollinger
George E. Bollinger,
BY
Alexander Forrell
Attorneys No. 751,251. Patented February 2, 1904.

UNITED STATES PATENT OFFICE.

JOHN CALVIN BOLLINGER AND GEORGE EDWARD BOLLINGER, OF OLYMPIA, WASHINGTON.

KNIFE.

SPECIFICATION forming part of Letters Patent No. 751,251, dated February 2, 1904.

Application filed July 11, 1903. Serial No. 165,127. (No model.)

*To all whom it may concern:*

Be it known that we, JOHN CALVIN BOLLINGER and GEORGE EDWARD BOLLINGER, both of Olympia, Thurston county, Washington, have invented certain new and useful Improvements in Knives; and we hereby declare that the following is a full, clear, and exact description thereof, reference being had to the accompanying drawings, which form part of this specification.

This invention is an improvement in knives for slicing bread, cake, and other light spongy materials; and its object is to provide a plurality of cutting or slicing blades on one handle so arranged that they may be operated as one, but will follow each other in cutting, acting in succession, so as not to interfere with each other or be clogged by the slices of material between the knives.

Our invention contemplates a plurality of knives attached to a common handle and arranged parallel in different horizontal planes, the outermost knife being below the adjacent knife, so that in cutting the outermost knife will enter the material before the next adjacent knife and will leave in the same order. The reasons for and advantages of this novel arrangement of knives will be hereinafter explained. In the drawings we have illustrated a two-bladed bread-knife embodying our invention; but three or even more blades might be used if arranged in the proper relative manner hereinafter explained. We also provide for adjustment of the knives so as to cut thick or thin slices.

We will now describe the invention as illustrated in the drawings and set forth in the claim the essential features thereof for which protection is asked.

In the drawings, Figure 1 is a perspective view showing the knife in use. Fig. 2 is a side view of the knife, enlarged; Fig. 3, a top view; Fig. 4, a section on line 4 4, Fig. 2.

The handle A has an enlarged flattened head B, which projects above the plane of the handle and, as shown, has a longitudinal slot *b* in its upper portion in line with handle. To the outer side of this head and at the lower part thereof is attached a knife-blade C, and to the opposite side and upper part of the head is attached a similar blade D. These blades, it will be noted, are arranged parallel to each other, but in different horizontal planes, and they are separated by the head a distance equal to the thickness of the slices to be cut by the second knife. As shown, the blades are attached to the handle by pairs of bolts *c* and *d*, respectively, which pass through suitably-located holes in the head and are retained by nuts *c' d'*, respectively. The bolts *d* transfix the slot *b* also and retain a filler-plate E therein when the blade D is attached to the outer side of the handle. If, however, it is desired to adjust the knives closer together, the bolts are loosened, knife D and filler-plate E removed and transposed, the knife D being secured in slot *b* and the plate against the side of the head. This brings the knives closer together laterally; but they maintain the stepped relation at all times. The object of this stepped relation or peculiar arrangement of the knives is to enable the knives to work properly and simultaneously without interference. If the knives are arranged in same plane side by side, as it has been heretofore proposed to do, for the purpose of slicing bread or other material, the slice between the knives will bind therebetween and obstruct the operation of the knives and result in crushing or tearing the material instead of cutting it, particularly if the material be light spongy bread or fresh or stale. By reason of our peculiar arrangement of the knives, however, there is no obstruction of the slices nor interference between the knives, the pressure in slicing bread is not in the same plane, but in two different planes, and there is no chance for the cut slice to wedge between the knives, for the second slice begins at the level of the top of the first knife, and the slices naturally lean outward over the knives without interference therebetween, and each knife works as freely as a single knife would do and will cut bread and other like material perfectly.

When knife D is inserted in slot *b*, the slices cut thereby will be thinner than when it is attached to the side of the head, as is obvious. When using the knife to cut bread, for example, it is well to place the loaf on a block of wood or on the side of the table with the end to be cut projecting thereover, so that the lower knife may cut through and pass below the loaf to enable the other knife to finish cutting without hindrance.

We do not claim herein the employment of knives arranged parallel and in the same plane, as such construction we have tried and found practically useless for slicing purposes, but do not restrict ourselves to the particular construction shown in the drawings, the essential feature of our invention being the employment of a plurality of knives arranged parallel and in different horizontal planes or stepped for the purpose above explained.

Our knives can be readily cleaned and sharpened without necessarily removing them from the handle, as they are practically accessible on all sides.

Having thus described our invention, what we therefore claim as new, and desire to secure by Letters Patent thereon, is—

A bread-slicer comprising a handle provided with a head having a plane side, and having in its back a series of slots parallel to said side; and knife-blades secured one to said plane side and the other in one of said slots, so that the edge of the latter knife is behind that of the former.

In testimony that we claim the foregoing as our own we affix our signatures in presence of two witnesses.

JOHN CALVIN BOLLINGER.
GEORGE EDWARD BOLLINGER.

In presence of—
  W. D. BOLLINGER,
  M. G. ROYAL.